J. R. REMINGTON.
Coffee Roaster.
No. 4,922.  Patented Jan'y 7, 1847.
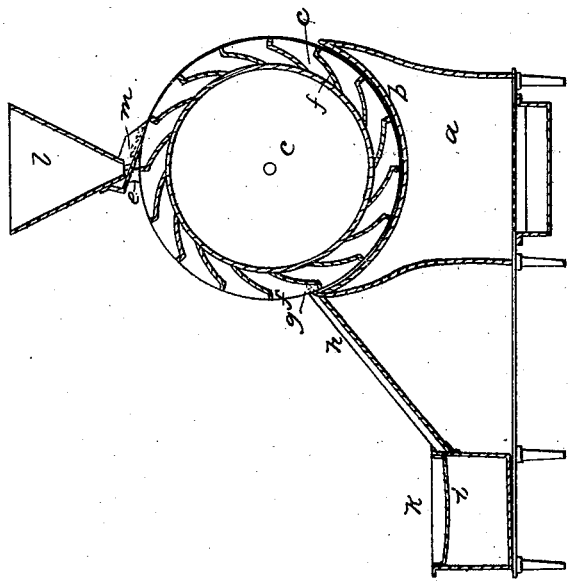
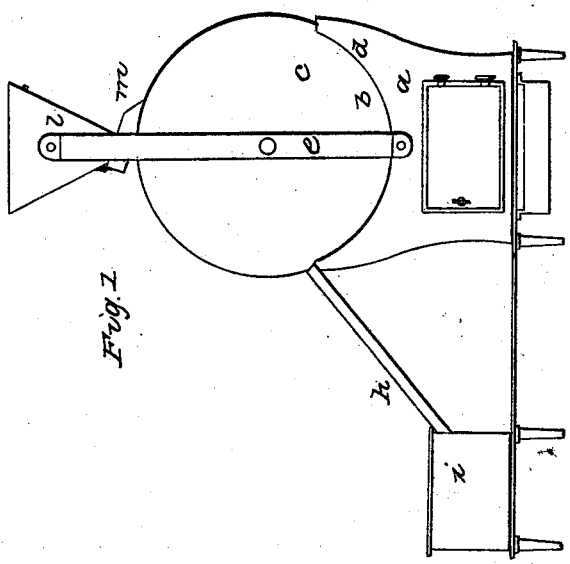

UNITED STATES PATENT OFFICE.

J. R. REMINGTON, OF BALTIMORE, MARYLAND.

COFFEE-ROASTER.

Specification of Letters Patent No. 4,922, dated January 7, 1847.

*To all whom it may concern:*

Be it known that I, JOHN R. REMINGTON, of Baltimore, in the State of Maryland, have invented a new and useful Apparatus for Toasting Coffee, which I denominate the "Self-Toasting Aroma-Condensing Apparatus," and that the following is a full, clear, and exact description of the principle or character which distinguishes it from all other things before known and of the manner of making, constructing, and using the same, reference being had to the accompanying drawings, making part of this specification, in which—

Figure 1 is a longitudinal elevation of the apparatus, and Fig. 2, a longitudinal vertical section thereof.

The same letters indicate like parts in all the figures.

The nature of my invention consists of a metallic wheel of buckets, somewhat similar to an overshot water wheel, but of small diameter, the buckets of which receive the grains of coffee that drop one by one from a hopper above, and which by their weight turn the wheel which carries the grains slowly through a circular trough below that extends around about one third the circumference of the wheel, and which is sufficiently heated by a small furnace to toast the coffee during the time that it is carried from one end to the other where it is discharged by means of an inclined spout into a vessel below where the aroma is condensed by cold water in a pan above—the buckets of the wheel being so formed as to contain the requisite quantity of coffee, to insure the turning of the wheel by the weight thereof, and so curved near the periphery as to drag the grains through the trough and up to the spout, and the hopper being provided with a hinged chute the inclination of which can be increased or decreased to regulate the delivery of the grains of coffee into the wheel whereby the motion of the wheel is gaged to the temperature of the furnace.

In the accompanying drawings (*a*) represents a small charcoal furnace, the top of which forms a trough (*b*) of a curve corresponding to the curvature of the periphery of the wheel (*c*), the sides (*d*) of this trough overlapping the rims of the wheel sufficiently to prevent the escape of small grains of coffee, as there must be sufficient space between the wheel and trough to prevent the surfaces from being in contact. The journals of the wheel (*c*) run in boxes in the standards (*e*, *e*), and the wheel is provided with buckets (*f*) in form similar to an overshot water wheel, except that at the periphery they are bent so as to be radial for a short distance for the purpose of acting as drags to drag the grains of coffee from the lower portion of the trough to the part (*g*) where they are delivered in a spout (*h*), down which they descend to a vessel (*i*) that has a dished cover (*k*) to contain cold water to cool the coffee and condense the aroma. Above the wheel there is a small hopper (*l*) with an aperture in the bottom for the discharge of coffee, one grain at a time, which falls onto an inclined chute (*m*) that guides them into the buckets of the wheel which is thus caused, by their weight, to turn slowly, delivering them onto the trough whence they are carried away with a motion regulated with reference to the temperature of the furnace to insure the proper toasting while passing through the trough. The delivery of the grains can be regulated by having the chute (*m*) hinged at the back and the front suspended by a cord so that the inclination can be increased or decreased at pleasure.

What I claim as my invention and desire to secure by Letters Patent is—

1. The method, substantially as herein described, of toasting coffee by means of a wheel of buckets which receives the grains of coffee from a hopper,—when this is combined with a heated trough through which the grains are passed by the rotation of the wheel, as herein described.

2. And I also claim in combination with the wheel and trough the condensing vessel for the purpose of condensing the aroma of the coffee, substantially as herein described.

JOHN R. REMINGTON.

Witnesses:
T. HANSON BELT,
WALTER R. JONES.